US006758438B2

(12) United States Patent
Brefort et al.

(10) Patent No.: US 6,758,438 B2
(45) Date of Patent: Jul. 6, 2004

(54) JET ENGINE SUSPENSION

(75) Inventors: François Brefort, Bernay (FR); Patrick Huet, Lisses (FR); Félix Pasquer, Lieusaint (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/263,736

(22) Filed: Oct. 4, 2002

(65) Prior Publication Data

US 2003/0066928 A1 Apr. 10, 2003

(30) Foreign Application Priority Data

Oct. 4, 2001 (FR) .............................. 01 12736

(51) Int. Cl.⁷ .............................................. B64D 27/00
(52) U.S. Cl. ....................... 244/54; 60/39.31; 248/554
(58) Field of Search .................... 244/54; 60/39.31; 248/554

(56) References Cited

U.S. PATENT DOCUMENTS

| 4,603,822 | A | * | 8/1986 | Chee |
| 5,873,547 | A | * | 2/1999 | Dunstan |
| 5,921,500 | A | | 7/1999 | Ellis et al. ..................... 244/54 |
| 6,341,746 | B1 | * | 1/2002 | Pascal et al. |
| 6,494,403 | B2 | * | 12/2002 | Jule et al. |
| 6,601,796 | B2 | * | 8/2003 | Roszak |
| 6,607,165 | B1 | * | 8/2003 | Manteiga |
| 2003/0025033 | A1 | * | 2/2003 | Levert et al. ................. 244/54 |

FOREIGN PATENT DOCUMENTS

| EP | 0 303 405 | 2/1989 |
| EP | 1 053 938 | 11/2000 |
| FR | 2 680 353 | 2/1993 |
| FR | 2 770 486 | 5/1999 |

* cited by examiner

Primary Examiner—J. Woodrow Eldred
(74) Attorney, Agent, or Firm—Oblon, Spivak, McClelland, Maier & Neustadt, P.C.

(57) ABSTRACT

A jet engine suspension includes a master component for attachment, fixed to an aircraft pylon. In the event of breakage of the master component and in the situation where the fixing screws are no longer able to transmit force, a peg is provided which resists transmitted loads such that the master component collapses until an upper shoulder rests on the pylon and supports the master component. The peg is free of dynamic stress in normal service and there is absolutely no risk of it cracking in fatigue.

3 Claims, 3 Drawing Sheets

JET ENGINE SUSPENSION

BACKGROUND OF THE INVENTION

1. Field of Invention

The subject of this invention is an aircraft jet engine suspension.

2. Summary of the Prior Art

One common type of suspension comprises a pair of devices for attachment to the front and rear of the jet engine, each device fixed to a pylon of the aircraft, and a pair of roughly longitudinal intermediate link rods one of whose function is to spread the loads through the two attachment devices appropriately so that the attachment device at the rear transmits to its pylon the transverse and vertical forces and the moment about the longitudinal axis in addition to the thrust of the engine, which is exerted first and foremost on the front suspension.

This attachment device at the rear is thus subjected to many static and dynamic loads which lead to a high risk of breakage. If breakage occurs therein, other damage may ensue.

Fatigue cracks may thus appear on the master component of the attachment device, which runs along the pylon and toward which the longitudinal link rods and the lower links carrying the jet engine converge. This master component is generally fixed to the pylon by four screws arranged in a rectangle. If the fatigue progresses to the extent of breaking through the master component or of isolating some of the screws, then the forces are transmitted only by the other screws, and this is obviously highly unfavorable. The idea of splitting the master component into two parts between which the screws are distributed such that a crack stops at the split has been known.

Although this arrangement does stop the master component from breaking, it entails joining together the two portions which are separated by the split using bolts which greatly increase the weight of the suspension. A suspension of this kind is described in French Patent 2 680 353, where the master component is not only split but duplicated so that each of its parts alone is able to withstand the loads and its weight is then even greater.

The risk of fatigue breakage relates to the actual fixing screws. Certain precautions need to be taken such as limiting the tightening force applied to them on mounting, in order to reduce this risk.

SUMMARY OF THE INVENTION

The object of the invention is to substitute, for screws rendered unserviceable, at least one peg passing at least partially through the master component of the attachment device and the pylon which takes over in transmitting loads. The peg is produced in such a way as not to experience significant dynamic loads beforehand, and this sets aside the risk of it having broken through fatigue.

The invention relates specifically to a jet engine suspension comprising a device for attachment to a fixed structure, comprising a master component fixed to the structure, wherein the master component and the fixed structure are connected by a vertical peg exhibiting a central shoulder placed on the master component, an upper shoulder above a portion of the fixed structure, and a lower shoulder between which and the central shoulder the main component is compressed.

Advantageously, the lower shoulder and the upper shoulder are formed by nuts engaged on threaded end portions of the peg, a device for preventing the nut of the upper shoulder from rotating being added.

DESCRIPTION OF THE PREFERRED EMBODIMENT

Figure 1:
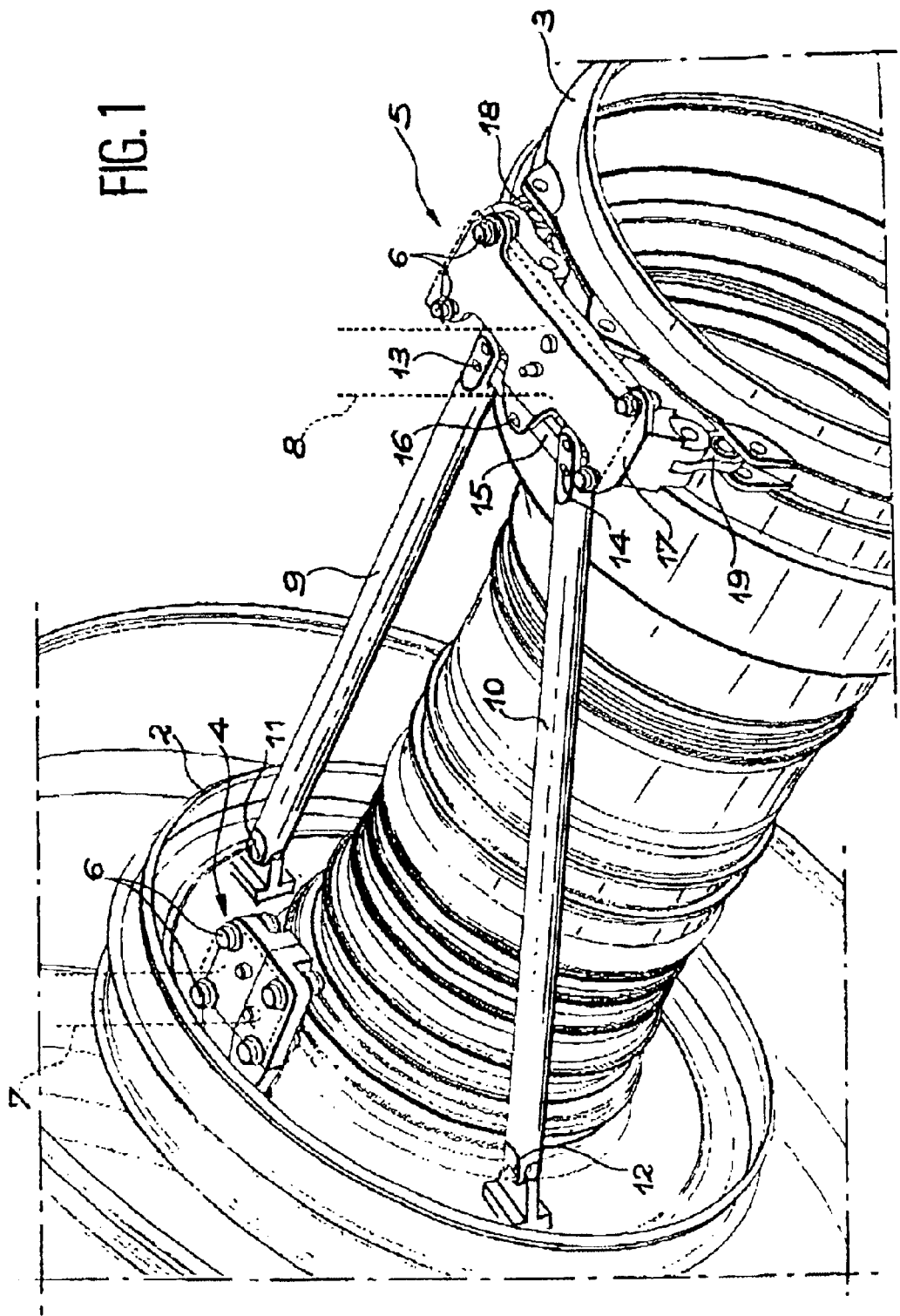
FIG. 1 is an overall view of the suspension.

The jet engine 1 illustrated in FIG. 1, only the case of which has been depicted, comprises in particular an intermediate casing 2 situated toward the front and an exhaust casing 3 situated toward the rear, borne respectively by a front attachment device 4 and by a rear attachment device 5. Bolts 6 are used to fix the attachment devices 4 and 5 under pylons 7 and 8 or other fixed structures of an aircraft. A pair of link rods 9 and 10 connects the attachment devices 4 and 5. They are more or less longitudinal and provided at their front ends with articulations 11 and 12 dependent on the intermediate casing 2 and at their rear ends with articulations 13 and 14 dependent on a balance beam 15, that is to say a rocking lever the middle of which is articulated by a central pin 16 to a fitting 17 which forms the master component of the rear attachment device 5 and which, via lateral links 18 and 19, supports the exhaust casing 3.

The link rods 9 and 10 are extended toward the fitting 17 and connected to it by additional articulations 20 and 21 situated on lugs 22 and 23 formed on the fitting 17 on each side of a central clevis 24 which bears the central pin 16 of the balance beam 15.

The articulations 13 and 14 of the link rods 9 and 10 to the balance beam 15 have a small amount of clearance but the additional articulations 20 and 21 to the fitting 17 have a greater amount of clearance which allows them to remain inactive, that is to say not to transmit load, under normal circumstances. The transmission of thrust and of the other forces is entirely through the balance beam 15, but if the latter, its pin 16 or the central clevis 24 breaks, the link rods 9 and 10, yielding to the thrust force, move longitudinally and the additional articulations 20 and 21 come into abutment, re-establishing the transmission of load to the fitting 17. The same thing happens if a link rod, 10, for example, breaks, the loads then being transmitted through the additional articulation 20 of the other link rod 9 and through the central pin 16. If, finally, a pin of an articulation 13 or 14 to the balance beam 15 breaks, then the balance beam 15 becomes inactive but the loads are still transmitted via the additional pins 20 and 21. In all these situations, the distribution of loads is modified only slightly as compared with normal conditions. The assembly remains isostatic and therefore does not allow unforeseen stresses to arise.

Figure 2:
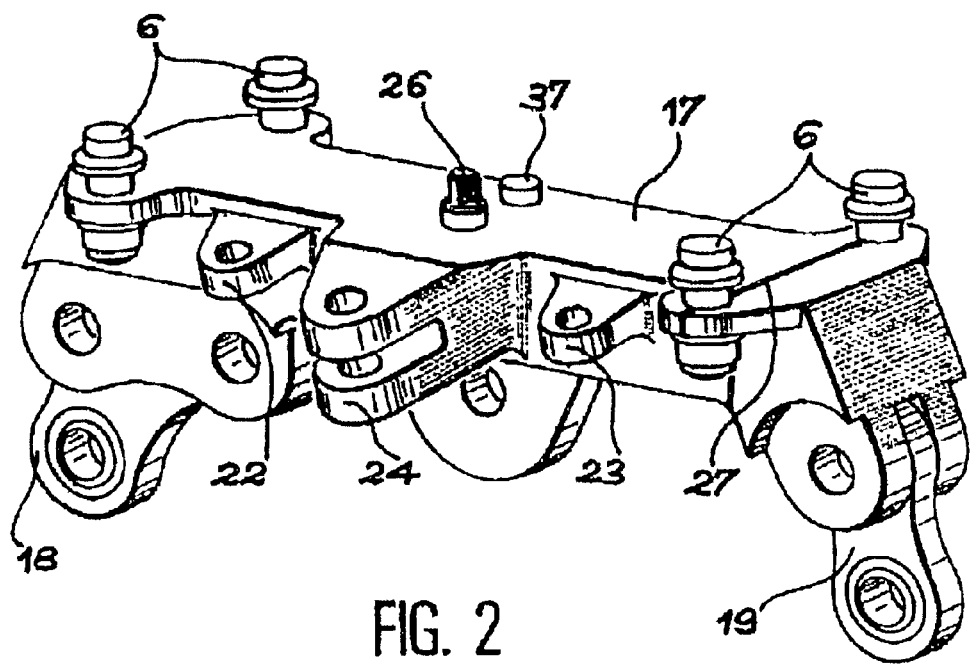
FIGS. 2 and 3 depict the rear suspension device with and without the link rods.
Figure 4:
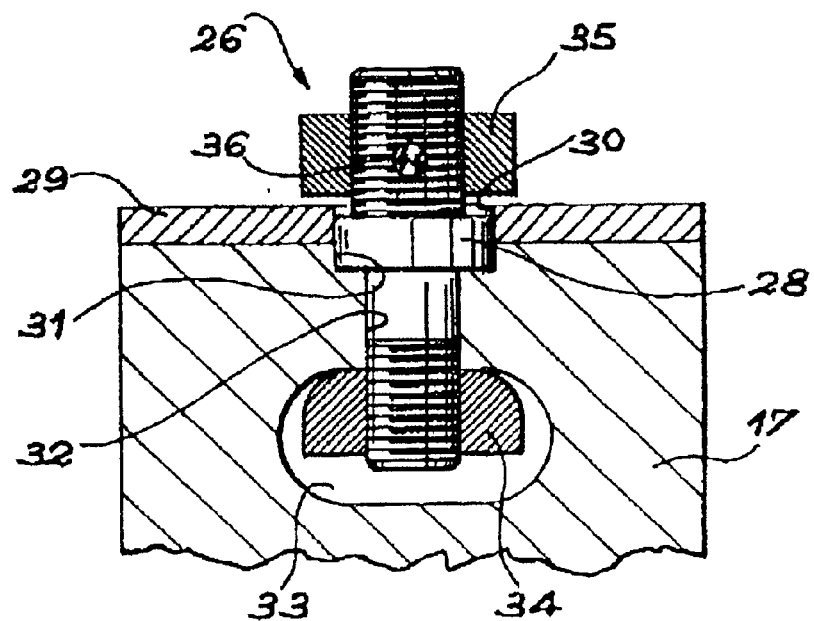
FIG. 4 illustrates a support peg of the attachment device.
Figure 3:
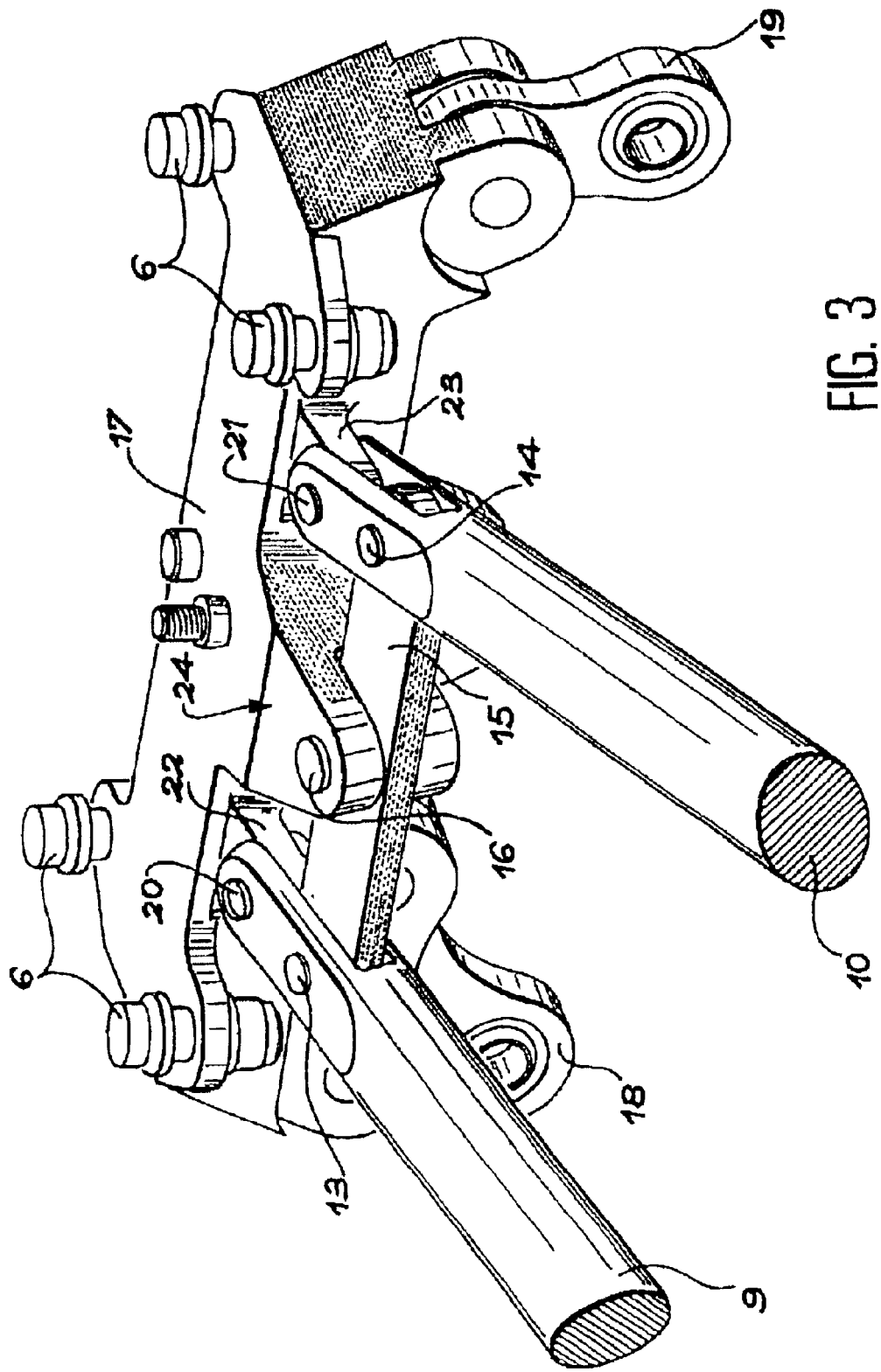

The characteristic device of the invention will now be described mainly with the aid of FIG. 4. This is a vertical peg 26 situated more or less at the middle of the fitting 17 and which serves to hold the plate 29 on the fitting against movements in the horizontal directions. However, its special shape, which will be described below, allows it to play a useful part when a crack 27, sketched in FIG. 2 and produced by fatigue, cuts the fitting 17 into two, passing, for example, through the drillings for two suspension screws 6 situated on the same side. The loads are then no longer transmitted to the pylon 8 by the screws, but the peg 26 lightens the load on the screws 6 which remain active, by its very presence and also by allowing a better distribution of the loads in the fitting 17.

The peg 26 has a central shoulder 28 which is partly engaged in a drilling in a plate 29 belonging to the pylon 8 and the rest of which is engaged in a counterbore 31 of a smaller-diameter drilling passing through part of the fitting 17 as far as a chamber 33. The central shoulder 28 is engaged in the drilling 30 and the counterbore 31 with very little clearance. The peg 26 also comprises a lower shoulder and an upper shoulder, which consist of nuts 34 and 35 engaged on threaded ends of the peg 26. However, while the lower nut 34 is clamped against the fitting 17 at the top of the chamber 33, the upper nut 35 is separated from the plate 29 by a small clearance that a pin 36 passing through the nut 35 and the peg 26 maintains, preventing the nut 35 from turning.

When the crack 27 has made some of the screws 6 unserviceable, the fitting 17 collapses, carrying the peg 26 downward until the upper nut 35 touches the plate 29, and this stops the collapsing movement: the peg 26 then supports the spar 17.

The central shoulder 28 is also advantageous for transmitting horizontal loads from the fitting 17 to the plate 29, because its larger cross section means that it experiences lower stresses.

The peg 26 may be bolstered by an additional peg 37, placed not far from it at the middle of the fitting 17 and which has the appearance of a conventional peg, passing through the fitting 17 and the plate 29 and comprising upper and lower shoulders similar to those of the peg 26, but no central shoulder. Circular and longitudinal clearances remain between the peg 37, the fitting 17 and the plate 29. Pegs 26 and 37 are not stressed before the crack 27 appears, except by a tensile load in the peg 26 between the central 28 and lower 34 shoulders, but this is an invariable clamping force which is therefore incapable of producing a fatigue crack, and except by a horizontal shear force at the central shoulder 28, but this is modest because of the width thereof. If, however, the peg 26 breaks, the peg 37, hitherto unloaded in respect of the horizontal loads by virtue of the clearance with which it is mounted, takes over from it in its function of holding the plate 29 on a fitting 17 in the horizontal directions.

We claim:

1. A jet engine suspension comprising a device for attachment to a fixed structure, comprising a master component fixed to the fixed structure, wherein the master component and the fixed structure are connected by a vertical peg exhibiting a central shoulder placed on the master component, an upper shoulder above a portion of the fixed structure, and a lower shoulder between which and the central shoulder the master component is compressed.

2. The jet engine suspension as claimed in claim 1, wherein the lower shoulder and the upper shoulder are formed by nuts engaged on threaded end portions of the peg, and which comprises a device for preventing the nut of the upper shoulder from rotating.

3. The jet engine suspension as claimed in one of claims 1 and 2 and which comprises a second vertical peg connecting the master component and the fixed structure.

* * * * *